Sept. 22, 1959 G. D. BRUCE, JR 2,905,383

REGISTER ZERO TEST

Filed Nov. 29, 1956 5 Sheets-Sheet 1

INVENTOR.
GEORGE D. BRUCE JR.
BY Murray Nanes
ATTORNEY

Sept. 22, 1959 G. D. BRUCE, JR 2,905,383

REGISTER ZERO TEST

Filed Nov. 29, 1956 5 Sheets-Sheet 2

Sept. 22, 1959 G. D. BRUCE, JR 2,905,383

REGISTER ZERO TEST

Filed Nov. 29, 1956 5 Sheets-Sheet 3

Sept. 22, 1959 G. D. BRUCE, JR 2,905,383

REGISTER ZERO TEST

Filed Nov. 29, 1956 5 Sheets-Sheet 4

Sept. 22, 1959 G. D. BRUCE, JR 2,905,383
REGISTER ZERO TEST
Filed Nov. 29, 1956 5 Sheets-Sheet 5

FIG.7

| ITEM | OLD ACC. BALANCE | ENTRY | $4^{th}$ ORDER CARRY | NEW ACC. BALANCE | TIME | EXTRA ORDER TRIGGER 100 | 9-NO9 TRIGGER 98 |
|---|---|---|---|---|---|---|---|
| RESET | | | | POSITIVE | | OFF | OFF |
| 1 | POS | POS (CA) | YES | POS | 4AB | ON | |
| | | | | | CARRY | OFF | |
| | | | | | 22AB | | ON |
| | | | | | 3AB | | OFF |
| 2 | POS | NEG (TA) | NONE | POS | 4AB | — | |
| | | | | | CARRY | — | |
| | | | | | 22AB | | ON |
| | | | | | 3AB | | OFF |
| 3 | POS | NEG (TA) | YES | NEG | 4AB | — | |
| | | | | | CARRY | ON | |
| | | | | | 22AB | | — |
| | | | | | 3AB | | ON |
| 4 | NEG | NEG (TA) | NONE | NEG | 4AB | — | |
| | | | | | CARRY | — | |
| | | | | | 22AB | | — |
| | | | | | 3AB | | — |
| 5 | NEG | POS (CA) | YES | NEG | 4AB | OFF | |
| | | | | | CARRY | ON | |
| | | | | | 22AB | | — |
| | | | | | 3AB | | — |
| 6 | NEG | POS (CA) | NONE | POS | 4AB | OFF | |
| | | | | | CARRY | — | |
| | | | | | 22AB | | OFF |
| | | | | | 3AB | | — |

United States Patent Office 2,905,383

Patented Sept. 22, 1959

2,905,383

REGISTER ZERO TEST

George D. Bruce, Jr., Poughkeepsie, N.Y., assignor to International Business Machines Corporation, New York, N.Y., a corporation of New York Application November 29, 1956, Serial No. 625,082

7 Claims. (Cl. 235—174)

This invention relates to a register test circuit and more specifically to an improved circuit for testing for and indicating a zero condition in a storage register.

In present day tabulating and computing machines, multiorder registers are utilized for storing decimal digital information, each register containing a counter for each order. These machines are provided with circuitry for testing for the presence of a zero or non-zero condition stored in the register, the result of the test being used to control some special machine function, or even the next operation to be performed by the tabulator or computer. A special problem exists in machines in which the zero may take two forms. Usually, the two forms that the zero may take are: the presence of zeros stored in each counter of the register, or the presence of nine's stored in each register counter.

It is, therefore, an object of the invention to provide an improved circuit for testing multiorder registers for the presence of a zero condition.

Another object of the invention is to provide a zero test circuit capable of detecting a zero in a register wherein the zero may take more than one form.

A further object of the invention is to provide a register zero test circuit having a minimum of electronic circuitry.

Other objects of the invention will be pointed out in the following description and claims, and illustrated in the accompanying drawings, which disclosed by way of example, the principle of the invention and the best mode which has been contemplated of applying that principle.

In the drawings:

Figs. 1A and 1B taken together comprise a wiring diagram of a portion of a computer, and zero test circuitry used in the computer.

Fig. 7 is a chart illustrating the operation of the balance sensing circuit of Fig. 1A.

*Logical blocks employed*

In order to explain the operation of the zero test circuit shown in Figs. 1A and 1B, a brief description will first be given of the logical blocks shown therein. These logical blocks include triggers, inverters, And circuits, Or circuits, multivibrators, counters and ring circuits, all very well known in the art. Detailed descriptions of these logical blocks may be found in an application, Serial No. 575,595 to W. E. Burns et al. filed April 2, 1956, in an application, Serial No. 346,934 to C. F. Weiss, Jr. et al. filed April 6, 1953, and in the Patent to R. L. Palmer, et al. 2,658,681 issued November 10, 1953, and therefore only the operations of these blocks as they apply to the present invention will be described.

Figure 1A:
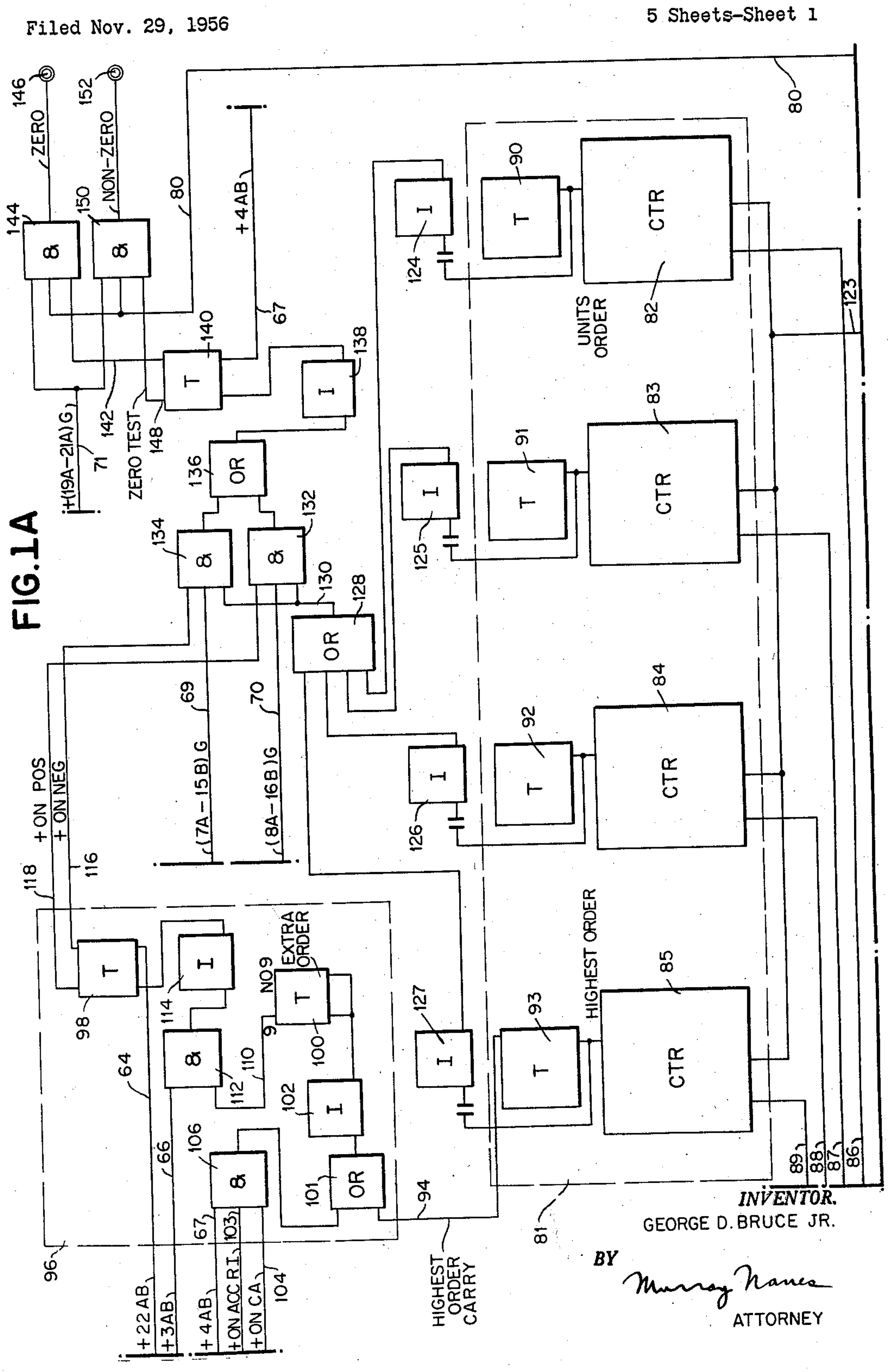
Figure 1B:
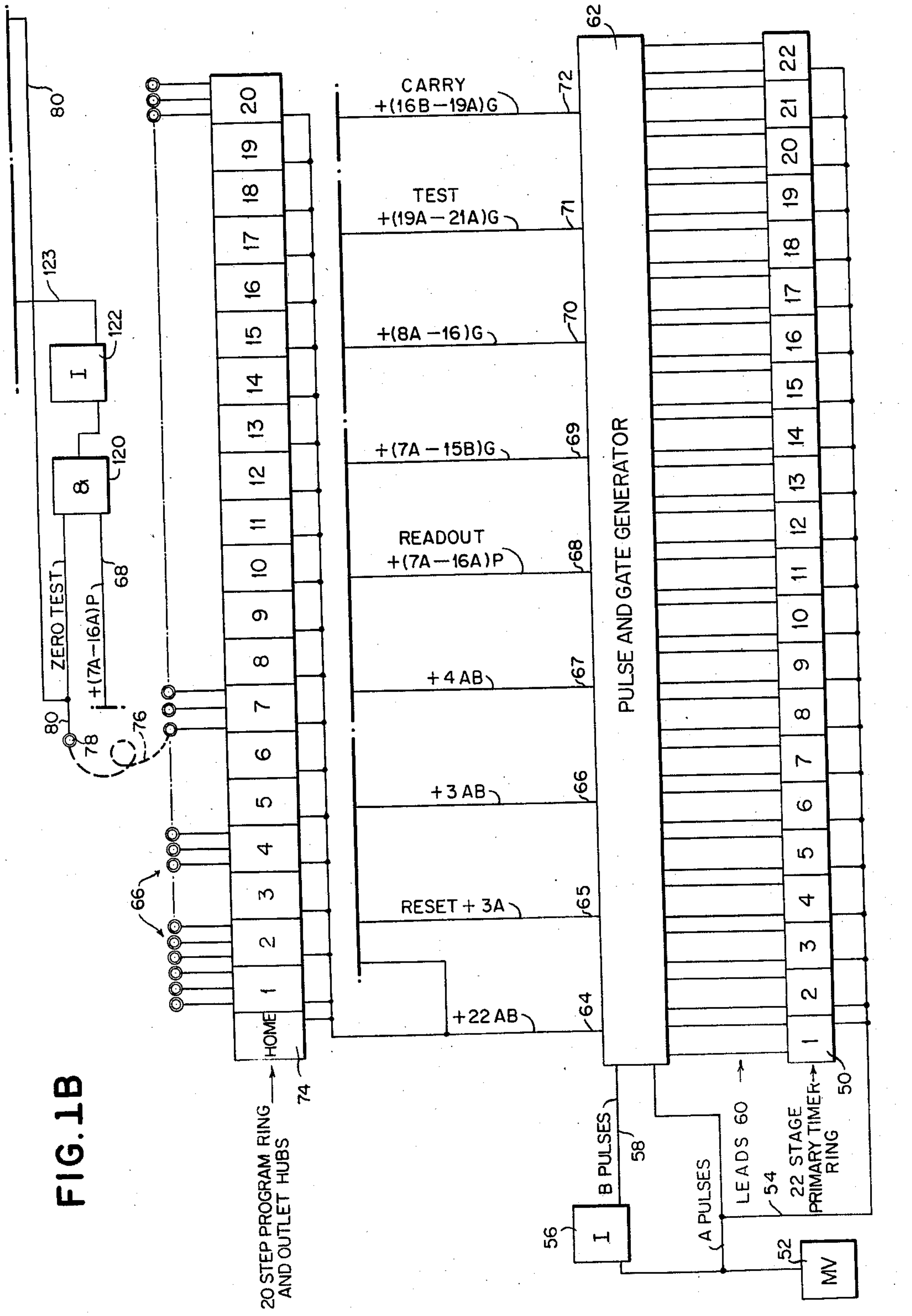

A trigger is a logical block having two stable conditions and is shown in Figs. 1A and 1B as a block containing at T therein and having its input terminals in the lower corners and its output terminals in the upper corners. A trigger can be switched from one stable condition to the other by applying a negative pulse to either one of its input terminals. Applying a negative pulse to its right-hand input causes its left-hand output to go negative and its right-hand output to go positive. This is known as the On condition. A negative input pulse to its left-hand input produces a positive condition at its left-hand output and a negative condition at its right-hand output, a state known as the Off condition. A trigger shown as having its right-hand and left-hand inputs connected together, is known as a binary input trigger, and operates to switch from whatever stable state it happens to be in, to the other state with each negative input pulse.

An inverter is a logical block which produces a 180° phase change in the input signal, causing a positive applied signal to appear as a negative output, and a negative applied signal to appear as a positive output. The inverter is shown in Figs. 1A and 1B as a block containing an I therein and having its input terminal at the lower left-hand corner and its output terminal at the lower right-hand corner.

An And circuit as utilized by the invention is a logical block requiring a plus condition on all of its input terminals in order to produce a plus condition on its output terminal. The And circuit is shown in Figs. 1A and 1B as a block containing an & therein, and having its input terminals at the left side of the block and its output terminal at the right side of the block.

An Or circuit is a logical block in which a plus condition on any one of its input terminals produces a plus condition at its output terminal. The Or circuit is shown in Fig. 1A as a block containing an Or therein, and having its input terminals at the left side and its output terminal at the right side.

A multivibrator is a logical circuit which produces relatively square wave output pulses at a fixed frequency. A multivibrator is shown in Fig. 1B as a block containing a MV therein, and have an output terminal at the top of the block.

A decimal counter consists of a group of four or more triggers interconnected so as to go through a sequence of combinational conditions in binary fashion, the sequence being, however, modified so that on the tenth input pulse, the counter produces an output carry pulse and returns to the zero condition. The number of pulses up to ten applied to the counter are then stored therein, and may be read out by feeding in more pulses and determining when the carry occurs. A counter is shown in Fig. 1A as a block containing a CTR therein, and having its input terminal at the bottom of the block and its output terminal at the top.

A ring circuit consists of a series of triggers interconnected in such a manner so that only one trigger at a time will be On. A series of pulses on a common input lead causes the triggers to step, that is, to be switched On in succession, each trigger being switched Off as the next one is switched On. An output lead of each trigger will produce an output pulse when turned On. If the last trigger of a ring circuit is connected back to the first trigger, the circuit is known as a closed ring circuit. In an open ring circuit, when the last trigger is turned Off the ring circuit stops stepping. Ring circuits are shown in Fig. 1B as a series of adjacent blocks each of which is a trigger stage containing the number of the stage.

*Computer environment*

By way of illustration the invention as shown in the drawings is embodied in a computer of a type generally as shown and described in the patent to R. L. Palmer et al., 2,658,681. This computer contains an accumulator (one form of register) which is tested for zero. The only difference between the computer in the Palmer patent and the computer to be now generally described is in the specific timing. The operation of the computer can be generally understood by reference to Fig. 1B. The primary timer 50 is a ring circuit of 22 triggers and it has outputs from the various triggers to produce pulses or voltage conditions at certain times in the primary cycle. These pulses and gates occur generally in the same sequential relationship as in the Palmer patent, but at slightly different times, for reasons which are of no consequence in understanding the invention. The primary timer ring is stepped along by pulses from a multivibrator circuit 52 via a lead 54. Since the primary timer ring 50 is a closed ring, after the twenty-second stage is turned On, the next pulse on lead 54 places the first trigger stage On, completing one cycle of operation. A group of 22 successive pulses constitutes one electronic cycle known as the primary cycle, each such cycle of the calculator can thus be considered to be divided into 22 cycle points. Therefore, when the primary timer is reset to normal, the calculator is at "1," and when the 12 trigger is on the calculator is at "12," etc.

Figure 2:
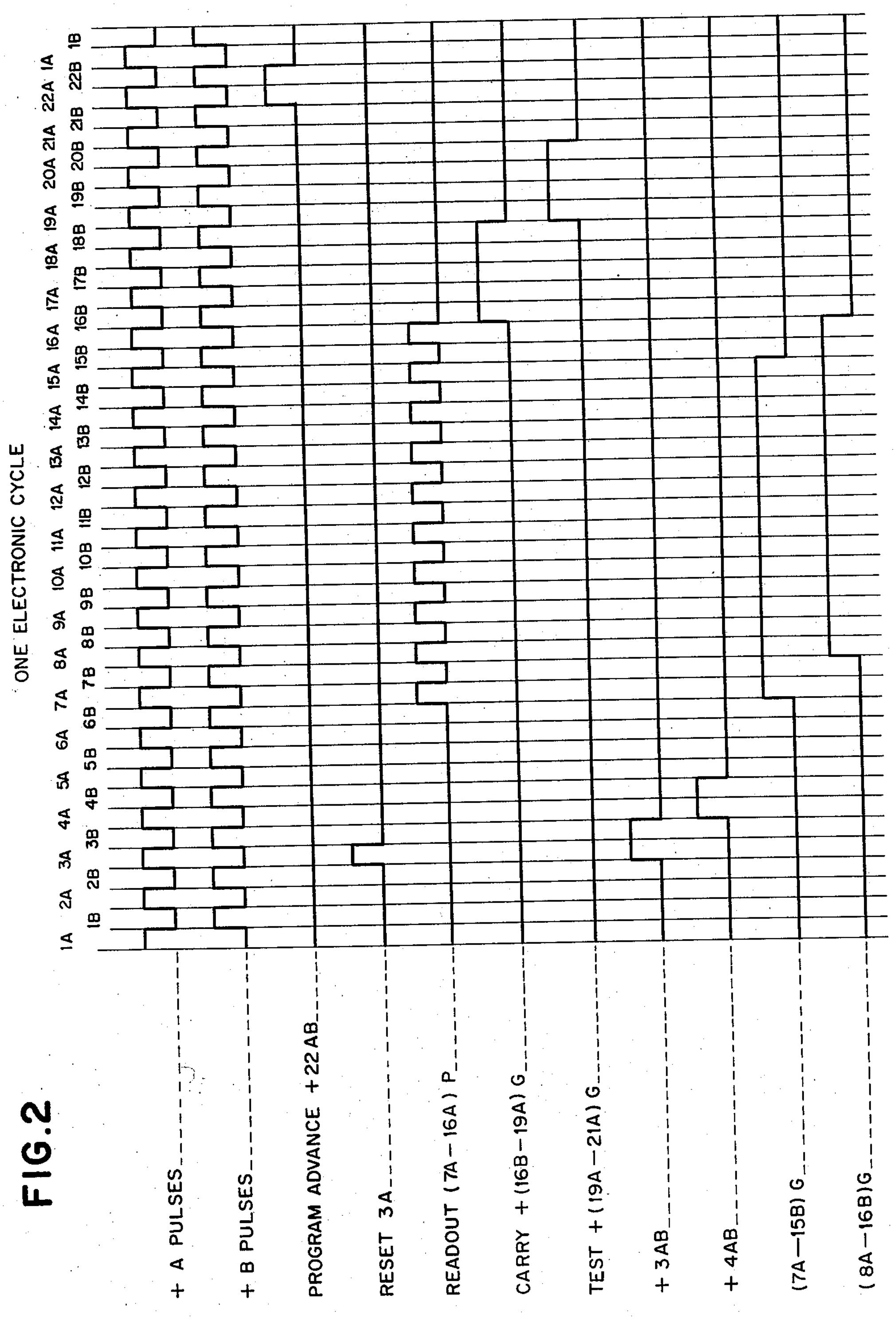
Fig. 2 is a timing diagram illustrating pulses and gates generated by the multivibrator and the "pulse and gate generator" of Fig. 1B.
Figure 3:
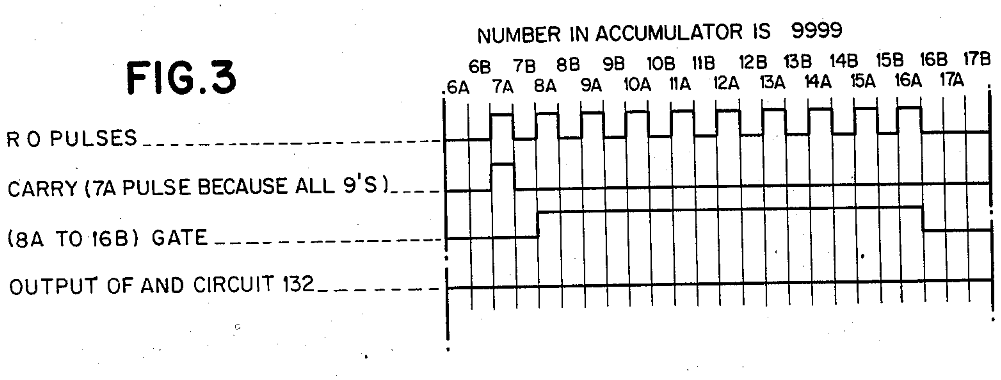
Fig. 3 is a timing diagram illustrating the pulses developed when the register is zero tested with a particular number stored in the register.

In order to simplify electronic timing terminology, reference notations has been set up which uses the suffix A and B. A pulses are produced at the output of the multivibrator 52 on line 54. These A pulses are fed to an inverter 56, the output of which at lead 58 will have pulses 180° out of phase with the A pulses, and known as B pulses. Therefore, as can be seen in Fig. 2, between successive A pulses there is always a B pulse.

Since the primary timer is advanced by A pulses, each step may be suffixed by the letter A to refer to a particular cycle point. Thus, when the primary timer is reset to normal, the calculator is said to be at 1A. Then as can be seen in Fig. 2, the next A pulses advances the timer to 2A, next to 3A, etc. Between 1A and 2A there is a B pulse known as 1B and between 2A and 3A there is a pulse 2B, etc. A pulse lasting from the beginning of one A pulse to the beginning of the next A pulse is called an AB pulse. All pulse notations are preceded by a plus or minus sign to indicate whether the pulse is a positive or negative pulse.

The term "gate" is used to signify a duration from one cycle point to another. A positive voltage change lasting from 16B to 19A is abbreviated +((16B–19A)G. A train of pulses is suffixed by the letter P rather than G. Thus a series of plus A pulses occurring between 7A and 16A is abbreviated +(7A–16A)P.

Circuit gating pulses and trains of pulses are developed under control of the primary timer by connecting the primary timer trigger output leads 60 to a pulse and gating generator 62. The circuits within the pulse and gating generator 62 are shown as individual circuits for the development of each of the different gates and trains of pulses. These circuits are described in detail in the above mentioned Palmer et al. patent, and Weiss et al. patent application and need not be further described herein. The more pertinent pulses and gates are developed in Fig. 1B at output leads 64 through 72, inclusive, from generator 62. The timing for these pulses and gates are shown in Fig. 2.

Lead 64 is utilized for feeding a +22AB pulse to a program ring circuit 74. The program ring circuit 74 is an open ring of a type described in said Weiss et al. application, but it may also be of a type described in the application Serial No. 404,172 on an Electronic Calculator filed January 15, 1954 by William W. Woodbury. The fall time of each +22AB pulse at 1A time causes the program ring circuit 74 to step from one trigger to the next. Each stage of the program ring 74 contains program exit hubs 66 which are made positive in succession. Many types of functions can be activated by the program exit hubs 66 in the calculator, such as "accumulator read-in, plus," "accumulator read-in minus," "accumulator read-out," "accumulator read-out and reset," "multiply," "divide," and "zero test." Each of these would utilize only those of the outputs of the pulse and gate generator 62 required by the particular function to which the hubs 66 are wired. For instance, an "accumulator read-out and reset" function would make use of the "reset," "carry" and "program advance" outputs among others, from the pulse and gate generator 62.

In Fig. 1B, one of the hubs 66 from trigger 7 of the program ring 74 is shown connected by a plug wire 76 to a zero test hub 78. Therefore, during program step 7, zero test hub 78 will go positive and so will the zero test lead 80 to which it is connected causing an accumulator 81, shown in Fig. 1A, as including four counters, 82 through 85 inclusive, to be zero tested. Each counter can store a decimal digit which is one order of the four digit number to be stored in the accumulator. It is to be understood that the accumulator may be more than four orders, but only four have been shown for ease of description. The digits may be entered from the computer by applying negative pulses on the leads 86 through 89 inclusive which are respectively connected to counters 82 through 85 inclusive.

Each counter will thus be in a combinational condition representative of the number of pulses fed therein. Reading out from the accumulator is accomplished by applying a train of pulses to each counter at fixed times and sensing when the counter carries. Since reading out is described in the hereinbefore mentioned Palmer patent, and since it is not necessary to understand it to understand zero testing, the specific readout circuitry is not shown, nor further described. Since the accumulator is used for adding and subtracting numbers, provisions must be made for carry. Counters 82 through 85 inclusive are therefore respectively connected to carry triggers 90 through 93 respectively. When any of the counters is in the combinational condition representative of a nine, the next pulse will produce a negative carry pulse from the counter to turn On its respective carry trigger. Circuitry is provided in the computer for adding the carry to the next highest order counter during carry time (16B–19A), but this circuitry is not shown as it is not needed for an understanding of the invention. The highest order carry trigger 93 has an output lead 94 which is fed to an accumulator balance sensing circuit 96.

*Accumulator balance sensing circuit*

Before describing the details of the zero test circuit, a description will be given of the mathematics of the accumulator operation. The 9's complement system is used in the accumulator. In this system, a 9 in the highest order indicates a positive balance, and all 9's indicates a positive zero. Since all zeros represent the 9's complement of all 9's the presence of all zeros in the accumulator represents a negative zero condition, and a zero in the highest order, therefore, indicates a negative balance. Thus, when the four position accumulator 81 stands at 9996, (the 6 being in units order counter 82) it indicates a positive number 0003. When the accumulator stands at 0003 it represents a negative number 0003 (−3). It can thus be understood that a "complement entry" into the accumulator (CA) is a positive entry and is actually an addition operation. A true entry into the accumulator (TA) is a negative entry and, therefore, a subtraction operation.

The accumulator balance sensing circuit 96 is provided to indicate whether the balance in the accumulator is positive or negative. The circuit 96 tests the accumulator 81 at the end of each program step and operates a 9–NO9 trigger 98 for indicating whether there is a positive or negative balance in the accumulator. During a given program step this trigger 98 indicates the accumulator balance at the end of the previous program step.

In order to utilize all four positions of the accumulator 81, an extra position is provided to indicate whether the accumulator 81 is positive or negative. The extra accumulator position consists of a trigger 100 which is Off to indicate a 9, and is On to indicate the absence of a 9. The extra position trigger 100 controls the 9–NO9 trigger 98 in a manner to be presently described. To understand how the extra position trigger 100 operates, the following conditions must be recognized:

(1) The extra position trigger 100 must reset with the accumulator 81 and indicate 9 (positive balance) in its reset position. Thus whenever it is necessary or desirable to reset the accumulator, the triggers 98 and 100 are also reset Off by circuitry well known in the art.

(2) In a cycle during which the accumulator balance remains positive or goes positive, the extra position trigger 100 indicates a 9.

(3) In a cycle during which the accumulator balance goes negative or remains negative, the extra position trigger 100 indicates 0 (i.e. NO9).

The extra position trigger 100 is controlled by means of carry-over pulses from the carry trigger 93 of the fourth position of the accumulator via lead 94, and Or circuit 101 and an inverter 102. The following rules apply to carry-over pulses from the fourth position of the accumulator.

(1) If the accumulator balance is positive and a positive entry (complement) is made, a carry-over occurs from the fourth position. (Accumulator balance is still positive.)

(2) If the accumulator balance is positive and a negative entry (true) smaller than the accumulator balance is made, no carry-over occurs from the fourth position. (Accumulator balance is still positive.)

(3) If the accumulator balance is positive and a negative entry larger than the accumulator balance is made, a carry-over occurs from the fourth position. (Accumulator balance has gone negative.)

(4) If the accumulator balance is negative and a negative entry is made, no carry-over occurs from the fourth position. (Accumulator balance is still negative.)

(5) If the accumulator balance is negative and a positive entry smaller than the balance is made, a carry-over occurs from the fourth position. (Accumulator balance is still negative.)

(6) If the accumulator balance is negative and a positive entry larger than the balance is made, no carry-over occurs from the fourth position. (Accumulator balance has gone positive.)

The above rules are condensed and illustrated in Fig. 7. Observe that only under the conditions listed in items 3 and 6 is there a change in the sign of the accumulator balance after the entry. Under these conditions, the extra position trigger 100 must show a reading at the end of a program step opposite to that shown at the beginning. Under all other conditions the extra position trigger 100 must indicate the same at the end of the program step as it indicated at the beginning.

Each time a positive (complement) entry is made and there is no change in the sign of the accumulator balance, a carry-over occurs. However, on a positive entry resulting in a sign change there is no carry-over. Conversely, each time a negative (true) entry is made and there is no change in the sign of the accumulator balance, no carry-over occurs; and on a negative entry resulting in a sign change there is a carry-over. This means that during a complement entry, a pulse must be fed to the extra position trigger 100 in addition to the carry-over pulse in order to insure the proper setting of the extra position trigger 100 at the end of a positive entry cycle.

In order to operate the extra position trigger 100 on successive program steps it is necessary to have a binary connection, so that successive pulses will change the trigger from one status to another. The additional pulse on a complement entry must come before carry occurs in order to counteract the carry-over pulse under conditions of items 1 and 5 to operate the extra position trigger 100 under conditions of item 6. This additional pulse comes to the extra position trigger 100 at 4AB in the electronic cycle and is controlled to come only during a complement entry to the accumulator. On all true entries the carry-over pulse alone will operate the extra position trigger 100. Thus the 4AB lead 67 and a + on Acc. R.I. lead 103, and a + on complement add lead 104 are connected to the inputs of an And circuit 106, the output of which is fed via the Or circuit 101 and the inverter 102 to the binary input extra order trigger 100. The extra order trigger 100 thus, receives pulses at 4AB time on accumulator read-in CA operations, and also if there is a fourth order carry from carry trigger 93. The operation of the extra position trigger 100 can be determined from an inspection of Fig. 7.

The 9–NO9 trigger 98 is set On, every cycle at 22AB by the lead 64, if it was Off. When the extra position trigger 100 if Off, its left-hand output lead 100 which is connected to an input of an And circuit 112 is positive. Thus the 3AB pulse on lead 66 at the other input of And circuit 112 produces an output which is fed via an inverter 114 to turn Off the 9–NO9 trigger 98 at 3AB. Thus the 9–NO9 trigger 98 follows the extra position trigger 100. Six different examples of the operation of the 9–NO9 trigger 98 are illustrated in Fig. 7. The 9–NO9 trigger 98 can change at 22AB or 3AB. Both of these timing pulses are at the beginning of a program step and place the trigger 98 in a condition indicative of the counter balance of the previous program step. When the 9–NO9 trigger 98 is On, its right-hand output lead 116 indicating a negative balance is positive. When the 9–NO9 trigger 98 is Off, its left-hand output lead 118 indicating a positive balance is positive.

*Zero test circuit*

The zero test circuit of Fig. 1A is conditioned by the zero test lead 80 of Fig. 1B going positive during program step 7 of the example. Lead 80 is one input of an And circuit 120, the other input of which is the (7A–16A) P lead 68. These ten read-out pulses (7A–16A) P are fed via an inverter 122 and a lead 123 to each counter stage of the accumulator 81.

To illustrate the operation of the zero test circuit of Fig. 1A, the four possible situations illustrated in Fig. 3 through 6 will be described. The first will be the situation where all 9's are in the accumulator, representative of a positive zero; the second situation will be where there are 9's in all orders of the accumulator except the units order, which has a 6, and is therefore representative of a positive non-zero condition. In the first situation, the first read-out pulse to the accumulator at 7A time will produce carries from each order of the accumulator 82 through 85, which are fed through respective inverters 124 through 127 to a 4 input Or circuit 128. A carry pulse from any one of the counters 82 through 85 will thus produce a carry pulse on an output lead 130 from Or circuit 128. Output lead 130 is connected to a pair of And circuits 132 and 134. And circuit 132 has three input leads, one of which is the + on positive balance lead 118. Therefore, in both of the situations now being described, lead 118 is positive. The second lead of And circuit 132 is the "8A to 16B gate" lead 70, and the third lead is the carry lead 130 from Or circuit 128. There will be no output from And circuit 132 at 7A time because the 8A to 16B gate on lead 70 is not yet positive (see Fig. 3). There will be no other carry pulses fed through lead 130 in this first situation (9999 in the accumulator) because all orders of the accumulator have carried at 7A time. Thus And circuit 132 will not produce an output pulse for feeding through an Or circuit 136 and an inverter 138 to the left-hand input of a zero test trigger 140. Since the right hand input of zero test trigger 140 is connected to the + 4AB lead 67, the fall of the 4AB pulse at 5A time will turn zero test trigger 140 to the On condition. As will be presently shown, the zero test trigger 140 in the On condition; represents a zero. Since no carry pulse is fed to the left hand input of the zero test trigger 140, it will remain in the zero representing state. It is to be noted that And circuit 134 also has its output connected to Or circuit 136 for the possible switching of the zero test trigger 140 to its On condition. And circuit 134 has three input leads; the + on negative balance lead 116, the (7A–15B) G lead 69, and the carry lead 130 from Or circuit 128. Since in the first two situations being described, lead 116 is negative, none of the carry pulses being produced on lead 130 will pass through And circuit 134. Thus in the first situation (9999 in the accumulator) neither And circuit 132 nor And circuit 134 will produce an output pulse for switching zero test trigger 140 to its non-zero representing state.

When the zero test trigger 140 is in the On condition its right hand output lead 142 which is connected to one input of an And circuit 144 is positive. The other two inputs to And circuit 144 are the + (19A to 21A) G lead 71 and the zero test 80. Thus, with the lead 80 positive because a zero test operation is plug wired, and the lead 142 positive because the zero test trigger 140 is On, the 19A to 21A gate on lead 71 will produce an output from And circuit 144 which becomes available at the "zero" representing hub 146 for utilization by the computor in any desirable manner. A left hand output lead 148 from zero test trigger 140 is negative. Lead 148 and the leads 71 and 80 are connected to the three inputs of an And circuit 150. The 19A to 21A gate on lead 71 will not pass through And circuit 150 to place a "non-zero" representing hub 152 in the positive condition because lead 148 is negative.

Figure 4:
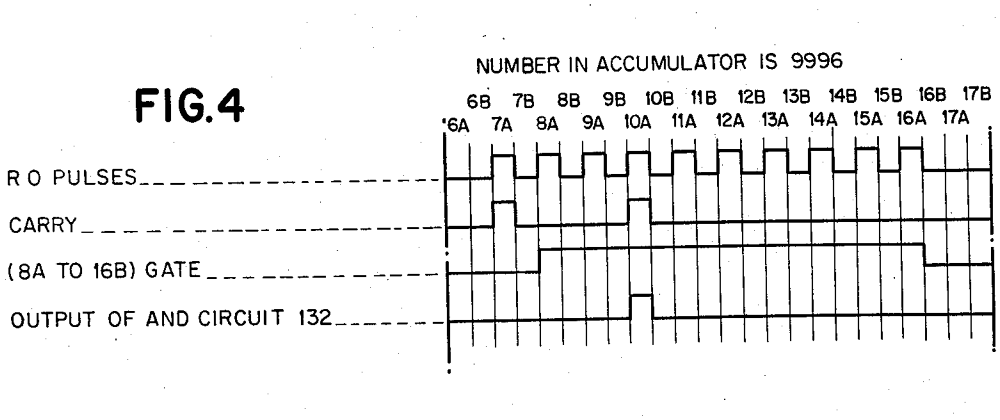
Figs. 4, 5 and 6 are timing diagrams similar to Fig. 3 illustrating the operation of the zero test with three different numbers stored in the register.

In the second situation (9996 in the accumulator) it takes four of the 7A to 16A read-in pulses to the units order counter 82 to produce a carry. Thus the carry will be produced at 10A time and fed through Or circuit 128 to And circuit 132. At this time, as illustrated in Fig. 4, the 8A to 16B gate on lead 70 is positive and And circuit 132 will have an output carry pulse which will be fed to the zero test trigger 140 for turning it Off. With the zero test trigger 148 in the Off condition, the 19A to 21A gate on lead 71 will go through And circuit 150 and appear on the "non-zero" representing hub 152, and not on the "zero" representing hub 146.

Figure 5:
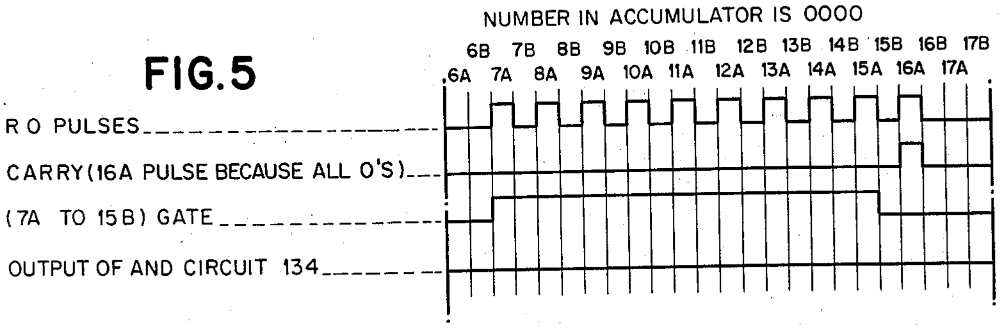
Figure 6:
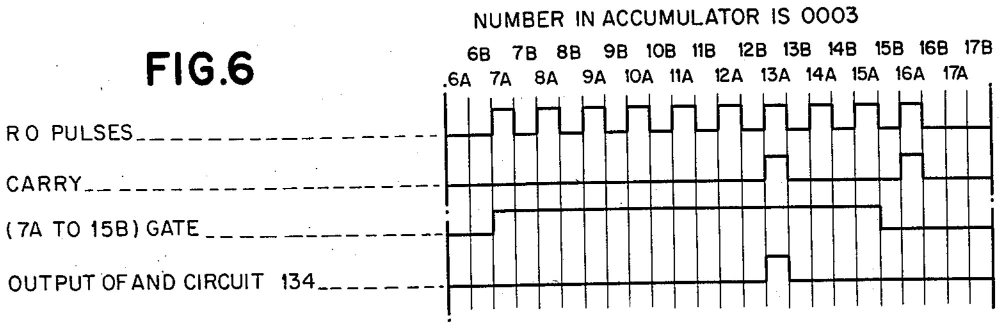

The third situation illustrated in Fig. 5 in which all orders of the accumulator stand at zero, representative of a negative zero, will now be described. In this situation the + on negative balance lead 116 will be positive, conditioning the And circuit 134. However, since it requires ten (7A to 16A) read-in pulses to step the counters from a zero representing state to the point where they will produce an output carry pulse, there will be no carry pulse produced on lead 130 until the tenth pulse at 16A time. However, since And circuit 134 has a 7A to 15B gate on its input lead 69, the 16A carry pulse comes too late to produce an output pulse from And circuit 134 for turning the zero test trigger 140 to its non-zero representing condition. The third situation will then produce a positive output at (19A to 21A) time on the "zero" representing hub 146. It can be understood that And circuit 132 will not produce an output pulse during this third situation because its + on positive balance input lead 118 remains negative.

Situation four is one in which all orders of the accumulator are zero except the units order which contains a 3 (and thus is representative of a negative non-zero in the accumulator). In this fourth situation in addition to the carry pulses produced at 16A time by the three highest orders of the accumulator, a carry will be produced after seven read-out pulses, at 13A time, from the units order counter 82. This carry pulse is fed through Or circuit 128 to And circuit 134, and since the lead 69 having the (7A to 15B) gate thereon is positive, a carry output will be produced from And circuit 134 to turn zero test trigger 140 into the non-zero representing state so that the (19A to 21A) gate on lead 71 causes the "non-zero" representing hub 152 to go positive.

It can be understood that the zero and non-zero representing hubs can be wired to control the next program step in the type of program ring illustrated in said aforementioned Woodbury application, or to control other computer functions.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A circuit for testing the state of a multiorder register of a predetermined radix for determining the presence of a zero state therein, comprising in combination, means for entering a number of pulses equal to said radix into each order of said register one pulse at a time, each pulse simultaneously entering all register orders and changing the state of said register order, each order of said register developing a register carry pulse when the entering pulse changes its state to a zero state, Or means connected to each order of the register and operative for producing a single Or carry pulse at the output of said Or means at each entering pulse time that one or more orders of the register produce a register carry pulse, a gating means connected to said Or means and operative for transmitting Or carry pulses at each entering pulse time except one pulse time, and indicating means connected to said gating means and having a zero and non-zero indicating state operative under control of an Or carry pulse transmitted from said gating means.

2. A circuit for testing the state of a multiorder register of a predetermined radix for determining the presence of a zero state therein, wherein the zero state may be represented by a zero state in each order of the register or by the radix minus one's complement of zero state in each order of the register, comprising in combination, means for entering a number of pulses equal to said radix into each order of said register one pulse at a time, each pulse simultaneously entering all register orders and changing the state of said register order, each order of said register developing a register carry pulse when the entering pulse changes to a zero state, Or means connected to each order of the register and operative for producing a single Or carry pulse at the output of said Or means at each entering pulse time that one or more orders of the register produce a register carry pulse, a first gating means connected to the Or means and operative for transmitting Or carry pulses at each entering pulse time except the first pulse time, a second gating means connected to the Or means and operative for transmitting Or carry pulses at each entering pulse time except the last pulse time, sensing means connected to said register for indicating the presence or absence of the radix minus one state in the highest order of the register at the beginning of the zero state test operation, said first and second gating means operative under control of said sensing means, and indicating means connected to said first and second gating means and having a zero and non-zero indicating state operative under control of an Or carry pulse transmitted from said gating means.

3. A circuit for testing the state of a multiorder register of a predetermined radix for determining the presence of a zero state therein, wherein the zero state may be a positive zero represented by the radix minus one's complement of zero state in each order of the register, or a negative zero represented by a zero state in each order of the register, comprising in combination, means for entering a number of pulses equal to said radix into each order of said register one pulse at a time, each pulse simultaneously entering all orders and changing the state of said order, each order of said register developing a register carry pulse when the entering pulse changes to a zero state, Or means connected to each order of the register and operative for producing a single Or carry pulse at the output of said Or means at each entering pulse time that one or more orders of the register produce a register carry pulse, a first gating means connected to the Or means and operative for transmitting Or carry pulses at each entering pulse time except the first, a second gating means connected to the Or means and operative for transmitting Or carry pulses at each entering pulse time except the last, balance indicating means connected to said register and having a negative indicating state indicative of a negative number in the register and a positive indicating state indicative of a positive number in the register, means at the beginning of a zero test operation to test said balance indicating means for the presence of a positive or negative number state in the register, said first and second gating means operative under control of said balance indicating means, indicating means connected to said first and second gating means and having a zero indicating state and a non-zero indicating state, means at a first time in said testing for operating the indicating means to the non-zero indicating state, means at a second time in said testing for causing any transmitted carry pulse to operate the indicating means to the zero indicating state, and means operative at a third time in said zero test for testing the indicating means for the presence of either the zero or the non-zero indicating states.

4. A circuit for testing the state of a multiorder decimal register for determining the presence of a zero state therein, wherein the zero state may be represented by either zero states in each order of the register or by nine states in each order of the register, comprising in combination, means for entering ten pulses into each order of the register one pulse at a time, each pulse simultaneously entering all register orders and stepping the state of the register order up one count, each order of the register developing a carry pulse when the incoming pulse steps its state from nine to zero, means for testing for and indicating the presence of a nine or no nine state in the highest order of the register, means connected to said register for blocking carry pulses from the register orders when the first of the ten entering pulses is fed to the register only at the time that there is a nine state in the highest order, means connected to said register for blocking carry pulses from the register orders when the tenth of the entering pulses is fed to the register only at the time there is a no nine state in the highest order, means connected to the blocking means for transmitting any carry pulse from the register which is not blocked by said blocking means, and zero indicating means connected to said transmitting means and operative under control of a transmitted carry pulse.

5. A circuit for testing the state of a multiorder decimal register for determining the presence of a zero state therein, wherein the zero state may be a positive zero represented by a nine state in each order of said register or a negative zero represented by a zero state in each order of said register, comprising in combination, means for entering ten pulses into each order of said register one pulse at a time, each pulse simultaneously entering all register orders and stepping the state of the register order up one count, each order of said register developing a carry pulse when the incoming pulse steps its state from nine back to zero, means for testing for and indicating the presence of a positive or a negative number state in the register, means connected to the register and to the number state testing means and operative only at the time that there is a positive number state in the register for blocking carry pulses from the register when the first of the ten pulses is entered into the register, means connected to the register and to the number state testing means and operative only at the time there is a negative number state in the register for blocking carry pulses from the register when the tenth of the ten roll-in pulses is entered into the register, indicating means having a zero indicating state and a non-zero indicating state, means at a first time in said testing for operating the indicating means to the non-zero indicating state, means connected to the blocking means and the indicating means and operative at a second time in said test for causing any carry pulse that is not blocked to operate the indicating means to the zero indicating state, and means operative at a third time in said zero test for testing the zero and non-zero indicating means for the presence of either the zero indicating state or the non-zero indicating state.

6. A circuit for testing the state of a multiorder decimal register for determining the presence of a zero state therein, wherein the zero state may be a positive zero represented by the state of nine in each order of the register or a negative zero represented by zero states in each order of the register, comprising in combination, means for entering ten pulses into each order of the register one pulse at a time, each pulse simultaneously entering all orders and stepping the value in the register order up one count, each order of the register developing a carry pulse when the incoming pulse steps its state from nine back to zero, balance indicating means connected to the register and having a negative indicating state indicative of a negative number in the register and a positive indicating state indicative of a positive number in the register, means at the beginning of said zero test to test said balance indicating means for the presence of a positive or negative number state in the register, means for developing a first gating pulse lasting from the time of the first entering pulse to the end of the ninth entering pulse and before the tenth entering pulse, means for developing a second gating pulse starting after the first entering pulse and before the second entering pulse and ending after the tenth entering pulse, and a first and a second And circuit, said first And circuit operative for transmitting a carry pulse from any order of the register under control of said first gating means and said balance indicating test means, said second And circuit operative to transmit a carry pulse from any order of the register under control of said second gating means and said balance indicating test means, and zero indicating means connected to said first and second And circuit and operative under control of a transmitted carry pulse.

7. A circuit for testing the state of a multiorder decimal register for determining the presence of a zero state therein, wherein the zero state may be a positive zero represented by the state of nine in each order of the register or a negative zero represented by a zero state in each order of said register, comprising in combination, means for entering ten pulses into each order of said register one pulse at a time, each pulse simultaneously entering all register orders and stepping the state of the register order up one count, each order of the register developing a carry pulse when the incoming pulse steps its state from nine back to zero, balance indicating means connected to the register and having a negative indicating state indicative of a negative number state of the register and a positive indicating state indicative of a positive number state of the register, means operative at the beginning of said zero test to test said balance indicating means for the presence of a positive or negative number state in the register, means for developing a first gating pulse lasting from the time of the first entering pulse to the end of the ninth entering pulse and before the tenth entering pulse, means for developing a second gating pulse starting after the first entering pulse and before the second entering pulse and ending after the tenth entering pulse, a first and a second And circuit connected to said balance indicating test means, said first And circuit operative for transmitting a carry pulse from any order of the register when a negative balance state is present in the balance indicating test means under control of said first gating means and said balance indicating test means, said second And circuit operative to transmit a carry pulse from any order of the register when a positive balance state is present in the balance indicating test means under control of said second gating means and said balance indicating test means, and indicating means having a zero indicating state and a non-zero indicating state, means at a first time in said testing for operating the indicating means to the non-zero indicating state, means connected to said first and second And circuit and operative at a second time in said testing for causing any transmitted carry pulse to operate the zero state indicating means to the zero indicating state, and means operative at a third time in said testing for testing the zero and non-zero indicating means for the presence of either the zero indicating state or the non-zero indicating state.

References Cited in the file of this patent

UNITED STATES PATENTS

| | | |
|---|---|---|
| 2,621,854 | Sprague | Dec. 16, 1952 |
| 2,658,681 | Palmer | Nov. 10, 1953 |